(12) United States Patent
Bitauld

(10) Patent No.: US 11,561,206 B2
(45) Date of Patent: Jan. 24, 2023

(54) PHOTOACOUSTIC APPARATUS AND METHODS

(71) Applicant: Nokia Technologies Oy, Espoo (FI)

(72) Inventor: David Bitauld, Massy (FR)

(73) Assignee: Nokia Technologies Oy, Espoo (FI)

( * ) Notice: Subject to any disclaimer, the term of this patent is extended or adjusted under 35 U.S.C. 154(b) by 308 days.

(21) Appl. No.: 16/909,238

(22) Filed: Jun. 23, 2020

(65) Prior Publication Data

US 2021/0003536 A1 Jan. 7, 2021

(30) Foreign Application Priority Data

Jul. 3, 2019 (EP) .................................... 19184223

(51) Int. Cl.
| | |
|---|---|
| *G01N 29/24* | (2006.01) |
| *G01N 21/17* | (2006.01) |
| *G02B 6/12* | (2006.01) |
| *G02B 6/124* | (2006.01) |

(52) U.S. Cl.
CPC ..... *G01N 29/2418* (2013.01); *G01N 21/1702* (2013.01); *G02B 6/12004* (2013.01); *G02B 6/1245* (2013.01); *G01N 2021/1704* (2013.01); *G01N 2201/06113* (2013.01); *G01N 2201/08* (2013.01); *G02B 2006/12138* (2013.01)

(58) Field of Classification Search
CPC ........... G01N 29/2418; G01N 21/1702; G01N 2021/1704; G01N 2201/06113; G01N 2201/08; G02B 6/12004; G02B 6/1245; G02B 2006/12138
See application file for complete search history.

(56) References Cited

U.S. PATENT DOCUMENTS

| | | | |
|---|---|---|---|
| 3,893,771 | A | 7/1975 | Bell |
| 4,019,056 | A | 4/1977 | Block et al. |
| 7,263,871 | B2 | 9/2007 | Selker et al. |
| 7,605,922 | B2 | 10/2009 | Willing et al. |
| 8,359,904 | B2 | 1/2013 | Nicoletti et al. |
| 8,857,242 | B2 | 10/2014 | Heidrich et al. |
| 11,073,469 | B2 * | 7/2021 | Dong ................. G01N 21/1702 |

(Continued)

FOREIGN PATENT DOCUMENTS

| | | |
|---|---|---|
| EP | 0282234 A1 | 9/1988 |
| WO | 2017/153765 A1 | 9/2017 |

OTHER PUBLICATIONS

Valicourt et al., "Hybrid-Integrated Wavelength and Reflectivity Tunable III-V/Silicon Transmitter", Journal of Lightwave Technology, vol. 35, No. 8, Apr. 15, 2017, pp. 1376-1382.

(Continued)

*Primary Examiner* — John Bedtelyon
(74) *Attorney, Agent, or Firm* — Harrington & Smith

(57) ABSTRACT

A photoacoustic apparatus, comprising:
at least one optical amplifier, configured to produce light;
at least one photonic integrated circuit, configured as a tunable light filter;
light guiding means, wherein the at least one optical amplifier, at least one photonic integrated circuit and light guiding means are configured as an optical cavity to produce laser light having an optical path within the optical cavity; and
at least one acoustic sensor configured to detect sound produced by analyte introduced into the optical path of the laser light.

20 Claims, 6 Drawing Sheets

(56) References Cited

U.S. PATENT DOCUMENTS

2018/0196012 A1    7/2018  Blanchard et al.

OTHER PUBLICATIONS

Starovoitov et al., "Intracavity Photoacoustic Sensing of Water Vapor with a Continuously Tunable External-Cavity Quantumcascade Laser Operating near 55 μm", Optics Letters, vol. 41, No. 21, 2016, 6 pages.
Wang et al., "Fiber-Ring Laser Intracavity QEPAS Gas Sensor using a 7.2 kHz Quartz Tuning Fork", Sensors and Actuators B: Chemical, vol. 268, Sep. 2018, pp. 512-518.
Borri et al., "Intracavity Quartz-Enhanced Photoacoustic Sensor", Applied Physics Letters, vol. 104, No. 9, 2014, 4 pages.
Latkowski et al., "Novel Widely Tunable Monolithically Integrated Laser Source", IEEE Photonics Journal, vol. 7, No. 6, Dec. 2015, 9 pages.
Extended European Search Report received for corresponding European Patent Application No. 19184223.6, dated Nov. 20, 2019, 9 pages.
Wang et al., "Fiber Laser Intracavity Quartz-Enhanced Photoacoustic Gas Sensor", Conference on Lasers and Electro-Optics (CLEO), May 13-18, 2018, 2 pages.
Glière et al., "A Coupled Model for the Simulation of Miniaturized and Integrated Photoacoustic Gas Detector", International Journal of Thermophysics, vol. 34, 2013, pp. 2119-2135.

\* cited by examiner

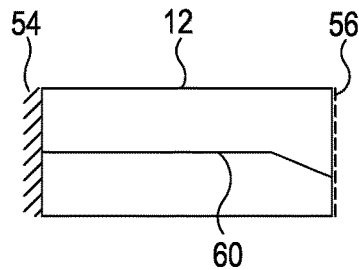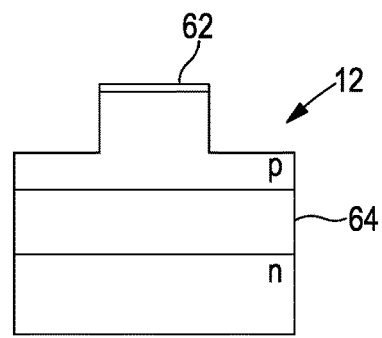
FIG. 3A  FIG. 3B
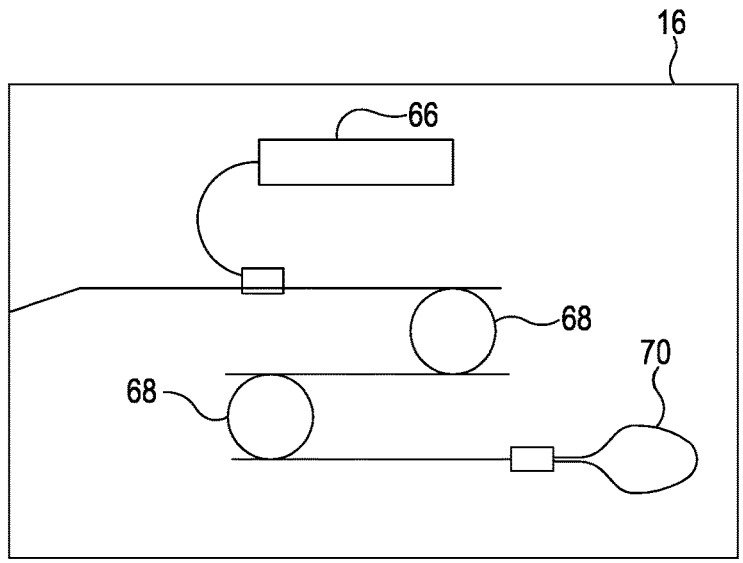
FIG. 4A
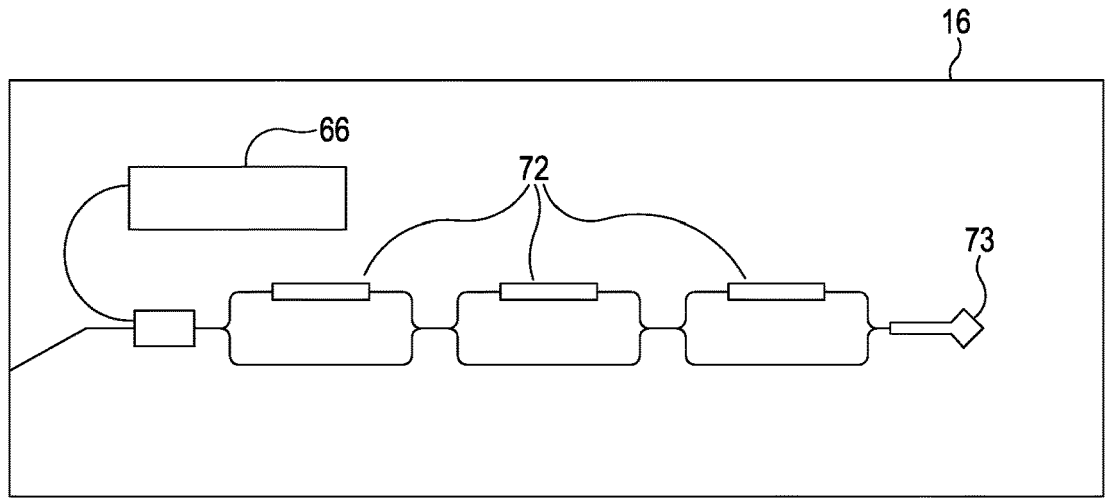
FIG. 4B

PHOTOACOUSTIC APPARATUS AND METHODS

TECHNOLOGICAL FIELD

Embodiments of the present disclosure relate to a photoacoustic apparatus and methods. Some relate to a photoacoustic apparatus and associated methods in photoacoustic spectroscopy.

BACKGROUND

Spectroscopy is a powerful technique with a wide range of applications, for example in environment and health analysis.

Spectroscopy using photoacoustic affect-based techniques is one of the most promising techniques for high sensitivity spectroscopy.

BRIEF SUMMARY

The scope of protection sought for various embodiments of the invention is set out by the independent claims. The examples and features, if any, described in this specification that do not fall under the scope of the independent claims are to be interpreted as examples useful for understanding various embodiments of the invention.

According to various, but not necessarily all, embodiments there is provided a photoacoustic apparatus, comprising:
   at least one optical amplifier, configured to produce light;
   at least one photonic integrated circuit, configured as a tunable light filter;
   light guiding means, wherein the at least one optical amplifier, at least one photonic integrated circuit and light guiding means are configured as an optical cavity to produce laser light having an optical path within the optical cavity; and
   at least one acoustic sensor configured to detect sound produced by analyte introduced into the optical path of the laser light.

In some but not necessarily all examples, the at least one optical amplifier comprises at least one semiconductor optical amplifier.

In some but not necessarily all examples, the at least one acoustic sensor comprises at least one quartz fork, and/or at least one microphone and/or at least one cantilever and/or at least one suspended waveguide.

In some but not necessarily all examples, the photoacoustic apparatus comprises means for introducing analyte into the optical path of the laser light.

In some but not necessarily all examples, the light guiding means comprises light coupling means configured to couple light between the at least one optical amplifier and the at least one photonic integrated circuit.

In some but not necessarily all examples, the at least one acoustic sensor is located between the at least one optical amplifier and the at least one photonic integrated circuit.

In some but not necessarily all examples, light guiding means comprises means for focusing the laser light to pass between prongs of the quartz fork.

In some but not necessarily all examples, the means for focusing comprises one or more ball lenses.

In some but not necessarily all examples, the at least one optical amplifier is formed as a first chip and the at least one photonic integrated circuit is formed as a second, separate chip.

In some but not necessarily all examples, the at least one optical amplifier and the at least one photonic integrated circuit are combined on a chip.

In some but not necessarily all examples, the photoacoustic apparatus comprises at least one acoustic resonator tube configured to amplify sound produced by the analyte.

According to various, but not necessarily all, embodiments there is provided a wearable device comprising at least one photoacoustic apparatus as recited in one or more preceding paragraphs and/or as described herein.

According to various, but not necessarily all, embodiments there is provided a system comprising:
   at least one photoacoustic apparatus as described in one or more preceding paragraphs and/or as described herein;
   means for controlling wavelength and/or amplitude modulation of the laser light; and
   means for measuring signal output from the at least one acoustic sensor.

According to various, but not necessarily all, embodiments there is provided a method comprising:
   providing at least one optical amplifier configured to produce light;
   providing at least one photonic integrated circuit, configured as a tunable light filter;
   providing light guiding means, wherein the at least one optical amplifier, at least one photonic integrated circuit and light guiding means are configured as an optical cavity to produce laser light having an optical path within the optical cavity; and
   providing at least one acoustic sensor configured to detect sound produced by the analyte.

In some but not necessarily all examples, the method comprises providing means for introducing analyte into the optical path of the laser light.

In some but not necessarily all examples, the at least one optical amplifier comprises at least one semiconductor optical amplifier.

In some but not necessarily all examples, the at least one acoustic sensor comprises at least one quartz fork, and/or at least one microphone and/or at least one cantilever and/or at least one suspended waveguide.

In some but not necessarily all examples, the method comprises providing means for introducing analyte into the optical path of the laser light.

In some but not necessarily all examples, the light guiding means comprises light coupling means configured to couple light between the at least one optical amplifier and the at least one photonic integrated circuit.

In some but not necessarily all examples, the method comprises locating the at least one acoustic sensor between the at least one optical amplifier and the at least one photonic integrated circuit.

In some but not necessarily all examples, light guiding means comprises means for focusing the laser light to pass between prongs of the quartz fork.

In some but not necessarily all examples, the means for focusing comprises one or more ball lenses.

In some but not necessarily all examples, the method comprises forming the at least one optical amplifier as a first chip and forming the at least one photonic integrated circuit as a second, separate chip.

In some but not necessarily all examples, the method comprises combining the at least one optical amplifier and the at least one photonic integrated circuit on a chip.

In some but not necessarily all examples, the method comprises providing at least one acoustic resonator tube configured to amplify sound produced by the analyte.

According to various, but not necessarily all, embodiments there is provided a method comprising: providing at least one wearable device as recited in one or more preceding paragraphs and/or as described herein.

According to various, but not necessarily all, embodiments there is provided a method comprising using at least one photoacoustic apparatus as described in one or more preceding paragraphs and/or as described herein to perform photoacoustic spectroscopy.

According to various, but not necessarily all, embodiments there is provided a photoacoustic apparatus, comprising:
at least one optical amplifier, configured to produce light;
at least one photonic integrated circuit, configured as a tunable light filter;
one or more light guiding components, wherein the at least one optical amplifier, at least one photonic integrated circuit and one or more light guiding components are configured as an optical cavity to produce laser light having an optical path within the optical cavity; and
at least one acoustic sensor configured to detect sound produced by analyte introduced into the optical path of the laser light.

According to various, but not necessarily all, embodiments there is provided a photoacoustic apparatus, comprising:
at least one optical amplifier, configured to produce light;
at least one photonic integrated circuit, configured as a tunable light filter;
one or more optical structures, wherein the at least one optical amplifier, at least one photonic integrated circuit and one or more optical structures are configured as an optical cavity to produce laser light having an optical path within the optical cavity; and
at least one acoustic sensor configured to detect sound produced by analyte introduced into the optical path of the laser light.

According to various, but not necessarily all, embodiments there is provided a photoacoustic apparatus, comprising:
at least one optical amplifier, configured to produce light;
at least one photonic integrated circuit, configured as a tunable light filter;
at least one light guiding arrangement, wherein the at least one optical amplifier, at least one photonic integrated circuit and one or more light guiding arrangements are configured as an optical cavity to produce laser light having an optical path within the optical cavity; and
at least one acoustic sensor configured to detect sound produced by analyte introduced into the optical path of the laser light.

According to various, but not necessarily all, embodiments there is provided examples as claimed in the appended claims.

BRIEF DESCRIPTION

Some examples will now be described with reference to the accompanying drawings in which:

FIGS. 3A & 3B shows an example of the subject-matter described herein;

FIGS. 4A & 4B shows examples of the subject-matter described herein;

DETAILED DESCRIPTION

Figure 1:
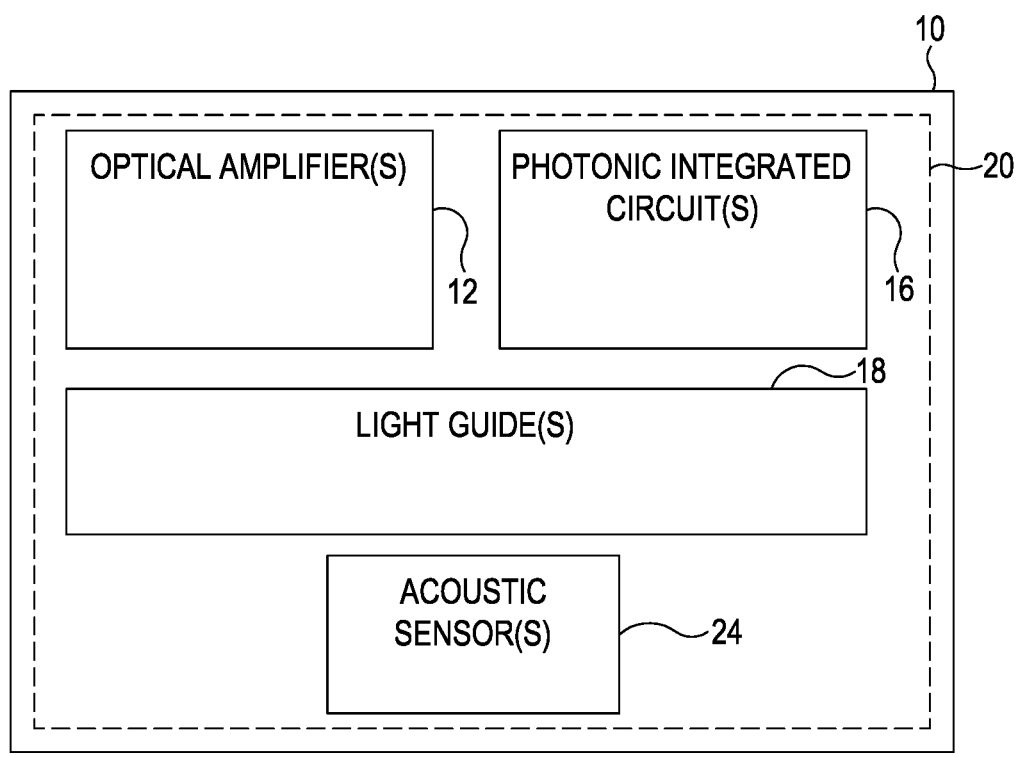
FIG. 1 shows an example of the subject-matter described herein.

Examples of the disclosure relate to a photoacoustic apparatus 10 and associated methods. In examples, the associated methods comprise a method of providing a photoacoustic apparatus 10 and a method of using a photoacoustic apparatus 10.

In examples, the photoacoustic apparatus 10 is an apparatus configured to be used in photoacoustic spectroscopy.

In some examples, the photoacoustic apparatus 10 comprises at least one optical amplifier 12, configured to produce light; at least photonic integrated circuit 16, configured as a tunable light filter; and light guiding means 18.

In examples, the light guiding means 18 can be considered at least one light guide, at least one light guiding arrangement, at least one light guiding structure, at least one optical arrangement, at least one optical structure, at least one light controlling arrangement and/or at least one light controlling structure and so on.

In examples, the light guiding means 18 is configured to control and/or direct and/or affect and/or manipulate light in the photoacoustic apparatus 10.

In examples, the light guiding means 18 can comprise one or more photonic integrated circuits 16 and/or one or more discrete light guiding/controlling structures and/or arrangements and/or elements and/or components.

In examples, the at least one optical amplifier 12, the at least one photonic integrated circuit 16 and the light guiding means 18 are configured as an optical cavity 20 to produce laser light 25 having an optical path 22 within the optical cavity 20.

In examples, the photoacoustic apparatus 10 also comprises at least one acoustic sensor 24 configured to detect sound produced by analyte 30 introduced into the optical path 22 of the laser light 25.

In examples analyte 30 can be considered to be any substance and/or material that is being analysed using the photoacoustic apparatus 10. For example, analyte 30 can be a fluid, such as a gas, that is analysed using the photoacoustic apparatus 10.

The photoacoustic apparatus 10 is advantageous as it provides a compact design for a photoacoustic apparatus 10 configured to be used in photoacoustic spectroscopy.

The photoacoustic apparatus 10 is also advantageous as it provides for wavelength tuning in photoacoustic spectroscopy with fixed parts/non-moving parts and high optical power compared to, for example, photoacoustic spectroscopy outside of a laser cavity.

This is beneficial in, for example, applications related to wearable devices.

FIG. 1 schematically illustrates an example of a photoacoustic apparatus 10.

Various features referred to in relation to FIG. 1 can be found in the other figures.

The photoacoustic apparatus 10, of FIG. 1, comprises:

at least one optical amplifier 12, configured to produce light 14;
at least one photonic integrated circuit 16, configured as a tunable light filter;
light guiding means 18; and
at last one acoustic sensor 24.

In the example of FIG. 1 the at least one optical amplifier 12, at least one photonic integrated circuit 16 and light guiding means 18 are configured as an optical cavity 20 to produce laser light 25 having an optical path 22 within the optical cavity 20.

In the example of FIG. 1 the at least one optical amplifier 12, at least one photonic integrated circuit 16 and light guiding means are configured as an optical cavity 20 to produce laser light 25 using the light 14 produced by the at least one optical amplifier 12.

In the example of FIG. 1, the at least one acoustic sensor 24 is configured to detect sound produced by analyte 30 introduced into the optical path 22 of the laser light 25.

The at least one optical amplifier 12 can comprise any suitable optical amplifier or amplifiers 12 configured to produce light 14. For example, the at least one optical amplifier 12 can comprise any suitable optical amplifier(s) 12 configured to produce light 14 that is usable in photoacoustic spectroscopy.

In examples, the at least one optical amplifier 12 can be considered at least one gain material, at least one gain chip and so on.

In examples, any suitable electrically pumped semiconductor, optically pumped solid, optically pumped liquid and/or optically pumped gas material can be used as the optical amplifier 12.

In examples, the at least one optical amplifier 12 is configured to produce a broad wavelength range of light 14 that can be filtered and/or tuned and/or selected by the at least photonic integrated circuit 16 to provide tunable laser light 25.

In examples the at least one optical amplifier 12 is configured to produce light 14 in the range of ultraviolet to mid-infrared. For example, the at least one optical amplifier 12 can be configured to produce light in the near-infrared and/or mid-infrared.

In examples the at least one optical amplifier 12 is configured to produce light 14 in at least a portion of the range 10 nanometers to 100 micrometers.

In some examples the at least one optical amplifier 12 is configured to produce light 14 in at least a portion of the range 100 nanometers to 50 micrometers.

In some examples the at least one optical amplifier 12 is configured to produce light 14 in at least a portion of the range 1 micrometer to 10 micrometers.

In examples, the at least one optical amplifier 12 comprises at least one semiconductor optical amplifier. See, for example, FIG. 3.

In examples, any suitable semiconductor optical amplifier can be used. For example, any suitable semiconductor optical amplifier comprising any suitable material(s) can be used.

In examples, a semiconductor optical amplifier configured to provide light 14 to form laser light 25 suitable for use in photoacoustic spectroscopy can be used.

For example, a III-V semiconductor, quantum well semiconductor, quantum dot semiconductor, quantum cascade semiconductor and/or inter-band cascade semiconductor can be used.

In examples, the photoacoustic apparatus 10 can comprise any suitable number of the same or different optical amplifiers 12.

The at least one photonic integrated circuit 16 is configured as a tunable light filter.

In examples, the at least one photonic integrated circuit 16 can be considered to be configured to tune and/or filter and/or select one or more wavelengths of laser light 25 in the photoacoustic apparatus 10.

In examples, the at least photonic integrated circuit 16 can be considered to be at least one wavelength filter, at least one wavelength tuner, at least one wavelength selector and/or at least one wavelength selection chip and so on.

In examples, the at least one photonic integrated circuit 16 can comprise any suitable photonic integrated component or components to tune and/or filter and/or select light from the optical amplifier(s) 12.

In examples, the at least one photonic integrated circuit 16 can comprise any suitable photonic integrated components to tune and/or filter and/or select laser light 25 in the photoacoustic apparatus 10.

For example, the at least one photonic integrated circuit 16 can comprise one or more ring resonators, one or more Mach-Zehnder interferometers and/or any other suitable wavelength tuning/filtering components and so on.

In examples, the at least one photonic integrated circuit 16 can comprise any suitable material or materials.

For example, the at least one photonic integrated circuit 16 can comprise at least one or more semiconductors, oxides, nitrides and/or polymers.

For example, the at least one photonic integrated circuit 16 can comprise at least one of silicon, silica, silicon nitride and/or polymer.

In examples, the at least one integrated circuit can comprise Germanium (Ge), Silicon carbide (SiC), Gallium arsenide (GaAs), Indium phosphide (InP), Gallium nitride (GaN), LiNb, Titanium dioxide (Ti02) and/or any suitable material(s) and/or alloys of these materials.

The light guiding means 18 are configured to control and/or direct and/or affect and/or manipulate light in the photoacoustic apparatus 10.

In examples, the light guiding means 18 can be considered at least one light guide, at least one light guiding arrangement, at least one light guiding structure, at least one optical arrangement, at least one optical structure, at least one light controlling arrangement and/or at least one light controlling structure and so on.

In examples, the light guiding means 18 can comprise one or more photonic integrated circuits 16 and/or one or more discrete light guiding/controlling structures and/or arrangements and/or elements and/or components.

In examples, the light guiding means 18 can comprise any suitable component to control and/or direct and/or affect and/or manipulate light in the photoacoustic apparatus 10.

For example, the light guiding means 18 can comprise one or more reflective components/structures/arrangements/components, one or more refractive components/structures/arrangements/components, and/or one or more diffractive components/structures/arrangements/components, and so on.

For example, the light guiding means 18 can comprise one or more lenses, one or more waveguides, one or more mirrors, one or more coatings, one or more reflectors, one or more diffractors, and/or one or more refractors and so on.

In examples, the light guiding means 18 comprises light coupling means 34 configured to couple light 14 between the at least one optical amplifier 12 and the at least one photonic integrated circuit 16.

In examples, the light coupling means 34 can be considered one or more light couplers, one or more light coupling arrangements, one or more light coupling components and/or one or more light coupling structures and so on.

The light coupling means 34 can comprise any suitable means/structure/arrangement/components configured to couple light 14 between the at least one optical amplifier 12 and the at least one photonic integrated circuit 16.

In examples, the light coupling means comprises one or more lenses, such as one or more ball lenses 38.

In some examples, the light guiding means 18 comprises means for focusing light.

In examples, the means for focusing light can be considered one or more focusers, one or more focusing arrangements, one or more focusing components, and/or one or more focusing structures and so on.

In examples, the means for focusing light comprises one or more mirrors and/or one or more lenses such as one or more ball lenses 38. See, for example, FIGS. 6 and 7.

The at least one acoustic sensor 24 is configured to detect sound produced by analyte 30 introduced into the optical path 22 of the laser light 25.

The at least one acoustic sensor 24 can comprise any suitable acoustic sensor or acoustic sensors 24.

In examples, the at least one acoustic sensor 24 comprises at least one quartz fork 26, and/or at least one microphone 28 and/or at least one cantilever and/or at least one suspended waveguide.

In examples, the at least one acoustic sensor 24 can be located at any suitable location(s) in the photoacoustic apparatus 10 to allow the at least one acoustic sensor 24 to detect sound produced by analyte 30 introduced into the optical path 22 of the laser light 25.

In examples, the at least one acoustic sensor 24 is placed near or proximate or adjacent or in the vicinity of interaction of analyte 30 and laser light 25 in the photoacoustic apparatus 10.

In some examples, the at least one acoustic sensor 24 is located next to or adjacent the at least one optical amplifier 12 to locate the acoustic sensor(s) 24 where the optical power is maximal.

For example, the at least one acoustic sensor 24 can be located next to or adjacent the at least one optical amplifier 12 to locate the acoustic sensor(s) 24 where the optical power is highest in the optical cavity 20.

In examples, the optical power at the at least one acoustic sensor 24 can be tens of mW. For example, the optical power at the at least one acoustic sensor can, in some examples, be in the range 10 mW to 100 mW.

In examples, the at least one acoustic sensor 24 is located between the at least one optical amplifier 12 and the at least one photonic integrated circuit 16.

In examples, the acoustic sensor 24 comprises a quartz fork 26 and the light guiding means 18 comprises means for focusing the laser light 25 to pass between prongs 36 of the quartz fork 26. See, for example, FIGS. 6 and 7.

In some examples, the means for focusing laser light 25 can be considered to focus the laser light 25 to go between or through prongs 36 of the quartz fork 26 without directly illuminating the prongs 36 and/or to focus the laser light 25 to go between or through prongs 36 of the quartz fork 26 without the laser light 25 being incident upon the quartz fork 26 and/or to focus the laser light 25 to minimize the beam width at the quartz fork 26.

In examples, the means for focusing comprises one or more ball lenses 38.

In some examples, the photoacoustic apparatus 10 comprises at least one acoustic resonator tube 44 configured to amplify sound produced by the analyte 30. See, for example, FIGS. 5 and 7.

In such examples, the light guiding means 18 are configured to focus and/or collimate the laser light 25 into a beam that is narrower than the resonator tube(s) 44.

The various features of the photoacoustic apparatus of FIG. 1 can be considered to be operationally coupled and any number or combination of intervening elements can exist (including no intervening elements).

In some examples, the photoacoustic apparatus 10 comprises means for introducing analyte 30 into the optical path 22 of the laser light 25.

Any suitable means for introducing analyte 32 into the optical path 22 of the laser light 25 can be used.

In examples, the means for introducing analyte 30 can be considered one or more cells, one or more chambers, one or more containers, one or more cavities and so on.

In examples, the means for introducing analyte 32 comprises at least one inlet 74 and at least one outlet 76 to allow fluid, such as gas to be introduced into the optical path 22 of the laser light 25.

In examples, the analyte under test comes into contact with the laser light either because the light propagates in free space at some point in the optical path 22 or the light 25 couples evanescently with the analyte 30 which may be in the form of a gas.

In some examples, the photoacoustic apparatus 10 does not comprise any particular means for introducing analyte 30 into the optical path 22 of the laser light 25 but rather a fluid, for example, such as air is allowed to penetrate the photoacoustic apparatus 10 to introduce analyte 30 into the optical path 22 of the laser light 25.

In examples, the at least one optical amplifier 12 is formed as a first chip 40 and the at least one photonic integrated circuit 16 is formed as a second, separate chip 42. See, for example, FIG. 7.

In some examples, the at least one amplifier 12 and the at least one photonic integrated circuit 16 are combined on a chip. See, for example, FIG. 2.

The photoacoustic apparatus 10 has a compact design compared to a conventional photoacoustic apparatus 10 and therefore is suited to, for example, wearable related uses.

In examples, there is provided a wearable device comprising at least one photoacoustic apparatus 10 as described herein.

In examples, there is also provided a system 48 comprising at least one photoacoustic apparatus 10 as described herein, means for controlling wavelength and/or amplitude modulation of the laser light 25 and means for measuring signal output from the at least one acoustic sensor 24. See, for example, FIG. 8.

In examples, any suitable means for controlling wavelength and/or amplitude modulation of the laser light 25 can be used.

In examples, the means for controlling wavelength and/or amplitude modulation of the laser light 25 can be considered modulation control hardware, modulation control software, one or more modulation control mechanisms, modulation control circuitry and/or one or more modulation control apparatuses and so on.

In examples, any suitable means for measuring signal output from the at least one acoustic sensor 24 can be used.

In examples, the means for measuring signal output from the at least one acoustic sensor 24 can be considered signal measurement hardware, signal measurement software, one or more signal measurement mechanisms, signal measurement circuitry and/or one or more signal measurement apparatuses and so on.

In examples, the photoacoustic apparatus 10 of FIG. 1 can comprise any number of additional components, including no additional components.

In some examples, one or more components can be omitted and/or combined.

FIG. 2 illustrates examples of a photoacoustic apparatus 10.

In examples, one or more elements illustrated in FIG. 2 can be as described in relation to FIG. 1.

Parts A, B and C, of FIG. 2, illustrate different arrangements of components or elements in a photoacoustic apparatus 10. The examples of FIG. 2 show different arrangements of an optical amplifier 12, photonic integrated circuit 16 and acoustic sensor 24.

Although the examples of FIG. 2 illustrate the components being arranged linearly, in examples, any suitable arrangement or layout of the components can be used. For example, the light guiding means 18 can comprise one or more elements or components configured to control light to allow the components to be arranged differently, including non-linearly.

Figure 2A:
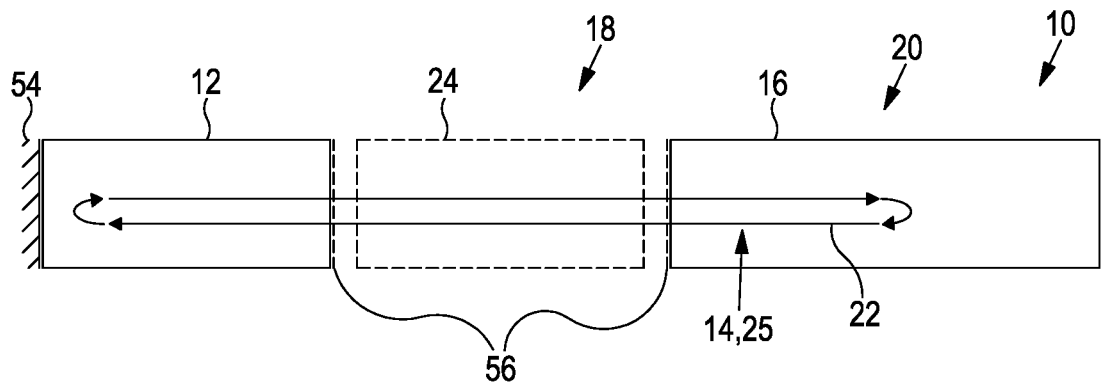
FIG. 2A-2C shows examples of the subject-matter described herein.

In the example of FIG. 2A, illustrated in the upper section of FIG. 2, a first arrangement of the photoacoustic apparatus 10 is shown.

In FIG. 2A, the acoustic sensor 24 is located between the optical amplifier 12 and photonic integrated circuit 16.

The optical path 22 or laser cavity round-trip is illustrated by the arrows passing through the illustrated components.

In the example of FIG. 2A, the end facet of the optical amplifier 12 comprises a high reflection coating 54 and the photonic integrated circuit 16 is configured to return the light providing the optical cavity 20 and the production of laser light 25.

In examples the high reflection coating 54 can have any suitable reflectivity. For example, the high reflection coating can have a reflectivity in the range 80% to 100%.

In some examples the high reflection coating 54 can have a reflectivity in the range 85% to 95%.

In some example the high reflection coating can have a reflectivity of substantially 90%.

In examples the facets of the illustrated components can be considered edges, sides, ends and so on.

The facets of the optical amplifier 12 and photonic integrated circuit 16 that are adjacent the acoustic sensor 24 comprise anti-reflection coating 56 to allow the light to freely traverse around the illustrated components.

In examples, the coatings 54, 56 can be considered to form part of the light guiding means 18 and/or the facilitated components 12, 16.

In examples, the photoacoustic apparatus 10 can comprise any other suitable light guiding means 18.

Figure 2B:
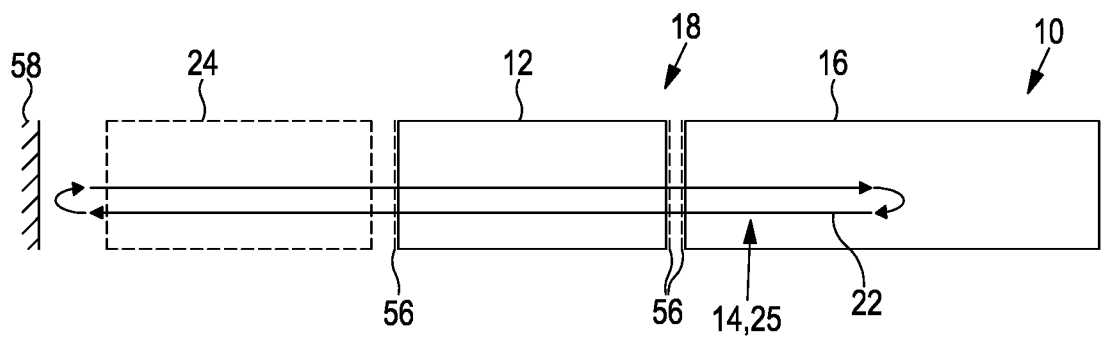

In the example of FIG. 2B a second arrangement of the photoacoustic apparatus 10 is illustrated.

The example of FIG. 2B is similar to the example of FIG. 2A, however in FIG. 2B the acoustic sensor 24 and optical amplifier 12 have been swapped such that the optical amplifier 12 is now located between the acoustic sensor 24 and photonic integrated circuit 16.

In the example of FIG. 2B a mirror 58 is present at one extreme of the apparatus to return the light 14 and the facets of the optical amplifier 12 and photonic integrated circuit 16 comprise anti-reflection coatings 56.

In the example of FIG. 2B the mirror 58 and/or coatings can be considered to form part of the light guiding means 18. Additionally, or alternatively, the coatings can be considered to form part of the associated components 12, 16.

Figure 2C:
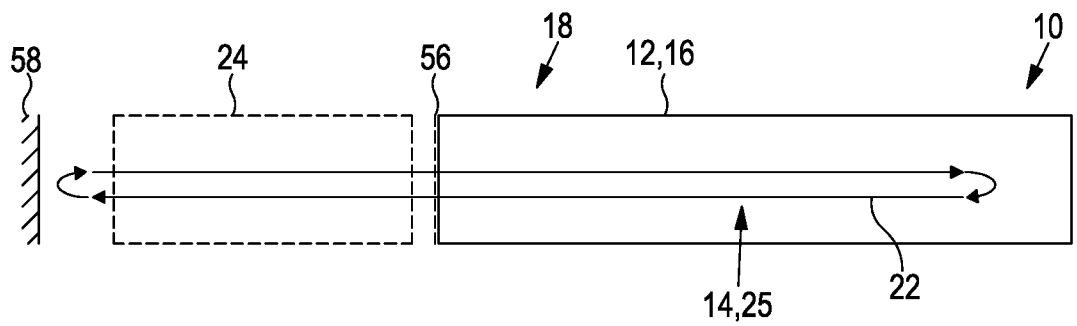

FIG. 2C illustrates a third arrangement of a photoacoustic apparatus 10.

The example of FIG. 2C is similar to the example of FIG. 2B, however in FIG. 2C the optical amplifier 12 and photonic integrated circuit 16 are combined into a single chip.

Accordingly, in the examples of FIGS. 2A and 2B can be considered to show the optical amplifier 12 and photonic integrated circuit 16 as two separate, different chips, and in the example of FIG. 2C to show the optical amplifier 12 and photonic integrated circuit 16 integrated onto a single chip.

In the example of FIG. 2C the acoustic sensor 24 is located to the left of the combined optical amplifier 12 and photonic integrated circuit 16.

In the example of FIG. 2C, at the extreme of the system, a mirror 58 is located to return the light 14 and the chip comprises an anti-reflection coating 56 on its facet next to the acoustic sensor 24.

In the illustrated examples, the acoustic sensor 24 is located next to the optical amplifier 12 where the optical power is maximal. This is advantageous as it provides maximal optical power for spectroscopy purposes.

However, in examples, any suitable arrangement of the optical amplifier(s) 12, photonic integrated circuit(s) 16 and acoustic sensor(s) 24, including any suitable light guiding means 18, for photoacoustic spectroscopy can be used.

For example, the acoustic sensor 24 could be placed to the right of the photoacoustic apparatus 10.

FIG. 3 illustrates an example of an optical amplifier 12.

In examples, the optical amplifier 12 in FIG. 3 can be used in a photoacoustic apparatus 10a described herein.

In part A, at the left, of FIG. 3 a top view of an optical amplifier 12 is shown. In the example of FIG. 3 the optical amplifier 12 can be considered a gain chip.

The optical amplifier 12 comprises a waveguide 60. The light 14, produced by the optical amplifier 12, propagates in the waveguide 60 where it is amplified.

In the example of FIG. 3 one end of the waveguide 60 is terminated by the facet of the optical amplifier 12 where a reflection coating 54 is deposited.

In some examples, the reflection is achieved using a distributed bragg reflector (DBR) along the waveguide or any other suitable reflection means/mechanism/arrangement/component/structure.

The other end of the waveguide 60 is configured to substantially minimize reflections by having an anti-reflection coating 56 and an angled intersection between the waveguide 60 and the facet of the optical amplifier/chip 12.

In some examples, the optical amplifier 12 does not comprise an angled intersection. In some examples, the optical amplifier 12 does not comprise an anti-reflection coating 56.

In the illustrated example, the gain enabling waveguide 60 is a p-n junction with an active layer in between where the charge carriers recombine to produce light. In examples, the active junction can comprise or be composed of carrier-confining structures such as quantum wells or quantum dots.

A cross-section of the optical amplifier 12 is shown in part B of FIG. 3.

The cross-section shows the metal contact 62 and p-n junction with the active layer 64 between.

FIG. 4 illustrates examples of photonic integrated circuits 16.

In examples, the photonic integrated circuits 16 illustrated in the example of FIG. 4 can be used in a photoacoustic apparatus 10 as described herein.

In examples, the photonic integrated circuits 16 can be Silicon on Insulator (SOI) or silica lightwave circuits (PLC) and so on.

The photonic integrated circuit 16 illustrated in FIGS. 4A and B can be considered a wavelength selecting chip and/or wavelength tuning chip and/or wavelength filtering chip.

FIG. 4A illustrates a first example of a photonic integrated circuit 16.

In the example of FIG. 4A, the photonic integrated circuit 16 comprises two ring resonators 68 and a loop reflector 70.

In the example of FIG. 4A the photonic integrated circuit 16 also comprises a wavemeter 66 to allow a determination of the wavelength of the laser light 25. However, in some examples, the wavemeter 66 is not included.

In the example of FIG. 4B, the photonic integrated circuit 16 comprises three Mach Zehnder Interferometers 72.

In FIG. 4B the photonic integrated circuit 16 also comprises a multimode interference reflector (MMI reflector).

In examples, tuning of the photonic integrated circuit 16 can be performed by thermo-optic effect, electro-optic effect and/or carrier injection and so on.

Although particular components have been illustrated in the examples of FIG. 4, in some examples any suitable photonic integrated circuits 16 for use in tuning/filtering/selecting the light can be used.

For example, reflection of the light can be obtained with loop reflectors, MMI reflectors, DBRs and/or the facet of the photonic integrated circuit 16.

FIG. 5 illustrates examples of acoustic sensors 24. In examples, the acoustic sensors 24 illustrated in the example of FIG. 5 can be used in a photoacoustic apparatus 10 as described herein.

Figure 5A:
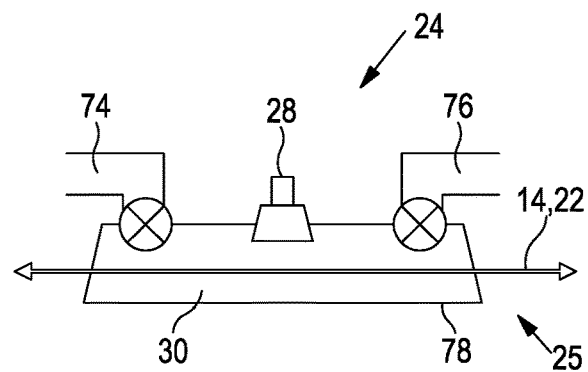
FIGS. 5A & 5B shows examples of the subject-matter described herein.

In the example of FIG. 5A, the acoustic sensor 24 comprises a microphone 28 located in a photoacoustic cell 78.

The photoacoustic cell 78 comprises an inlet 74 and an outlet 76 through which the analyte 30 can be introduced to the photoacoustic cell 78.

The optical path 22 of the light 14 in the form of laser light 25 is illustrated by the double-headed arrow.

It can be seen in FIG. 5A that the laser light 25 traverses the photoacoustic cell 78 containing the analyte 30.

Figure 5B:
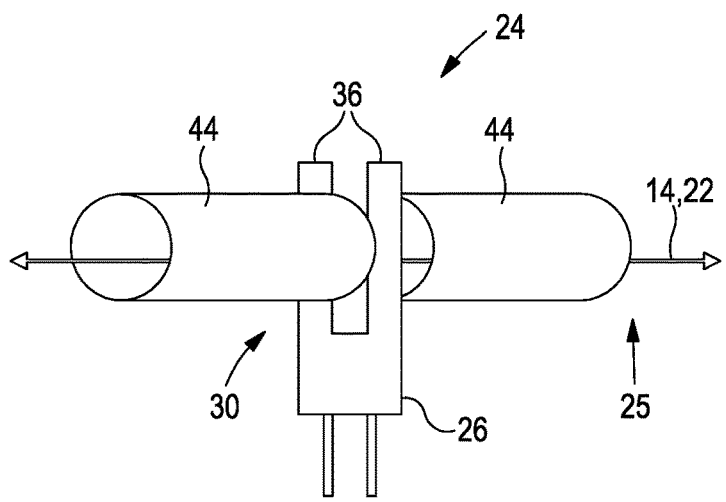

In the example of FIG. 5B the acoustic sensor 24 comprises a quartz fork 26 comprising two prongs 36.

In the example of FIG. 5B there is also illustrated an acoustic resonator tube 44 at either side of the quartz fork 26.

However, in some examples, one or more of the acoustic resonator tubes 44 is not present.

In FIG. 5B it can be seen that the optical path 22 of the light 14 in the form of laser light 25 passes through the optical resonator tubes 44 and prongs 36 of the quartz fork 26. This is illustrated by the double-headed arrow in the example of FIG. 5B.

In the example of FIG. 5B the apparatus 10 is exposed to the surrounding air to introduce the analyte 30 in between the prongs 36 of the quartz fork 26.

Although particular examples of acoustic sensors 24 illustrated in the examples of FIG. 5, in examples any suitable acoustic sensor or sensors 24 can be used.

For example, the photoacoustic cell 78 can be omitted from the example of FIG. 5B and/or a photoacoustic cell 78 included in the example of FIG. 5B.

Figure 6:
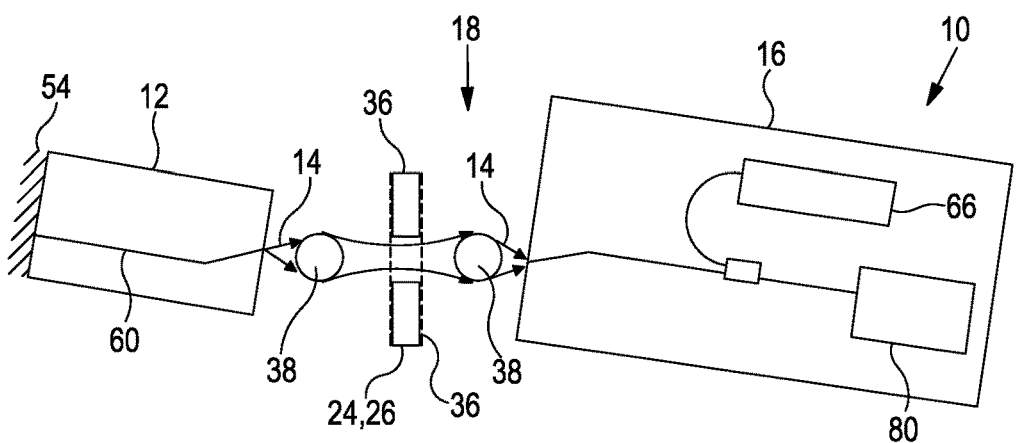
FIG. 6 shows an example of the subject-matter described herein.

FIG. 6 schematically illustrates an example of a photoacoustic apparatus 10.

One or more elements of FIG. 6 can be as described in relation to one or more of FIGS. 1 to 5.

The photoacoustic apparatus 10 shown in FIG. 6 comprises an optical amplifier 12, a photonic integrated circuit 16 and an acoustic sensor 24 located between the optical amplifier 12 and photonic integrated circuit 16.

In the example of FIG. 6, the optical amplifier 12 comprises a reflection coating 54 at one extreme of the apparatus 10.

In the example of FIG. 6, the photonic integrated circuit 16 comprises one or more photonic integrated components 80 configured to filter/tune the light 14 from the optical amplifier 12.

For example, the photonic integrated circuit 16 can be as described in relation to FIG. 4.

In the example of FIG. 6 the optical integrated components 80 are configured to return the light to create the optical cavity for laser light 25 to be produced.

In the example of FIG. 6, the acoustic sensor 24 is a quartz fork 26 comprising two prongs 36.

In FIG. 6, the light guiding means 18 comprises two ball lenses 38, one either side of the quartz fork 26.

The ball lenses 38 are configured to focus the light 14, in the form of laser light 25, to pass between the prongs 36 of the quartz fork 26.

In the example of FIG. 6 the ball lenses 38 are also configured to couple the light between the optical amplifier/gain chip 12 and photonic integrated circuit 16.

Although ball lenses 38 have been shown in the example of FIG. 6, in examples any suitable focusing element and/or light guide 18 can be used.

Focusing the laser light 25 to pass between the prongs 36 of the quartz fork 26 is advantageous as it prevents the photoacoustic signal from being swamped by the signal from the material of the quartz fork 26.

FIG. 7 illustrates examples of photoacoustic apparatus 10. One or more elements illustrated in the examples of FIG. 7 can be as described in relation to one or more of FIGS. 1 to 6.

The examples of FIG. 7 show 3-D views of photoacoustic apparatuses 10.

Figure 7A:
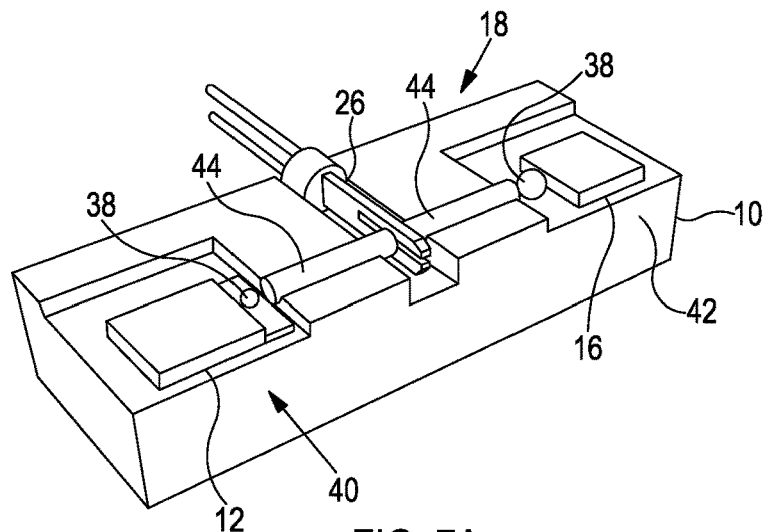
FIG. 7A-7C shows examples of the subject-matter described herein.

In the example of FIG. 7A, the photoacoustic apparatus 10 comprises an optical amplifier 12, a photonic integrated circuit 16 and an acoustic sensor 24, in the form of a quartz fork 26, located between the optical amplifier 12 and photonic integrated circuit 16.

In the example of FIG. 7A the optical amplifier 12 is formed as a first chip and the photonic integrated circuit 16 is formed as a second, different chip.

In the example of FIG. 7A two ball lenses 38 are located to collimate and/or focus the light 14, 25 between the prongs 36 of the quartz fork 26.

Furthermore, in the example of FIG. 7A two acoustic resonators 44 are present between the optical amplifier 12 and photonic integrated circuit 16.

Accordingly, in the example of FIG. 7A the optical path 22 is formed by optical amplifier 12—ball lens 38—acoustic resonator tube 44—quartz fork 26—acoustic resonator tube 44—ball lens 38—photonic integrated circuit 16 and the light traverses this optical path 22 to form laser light 25.

Figure 7B:
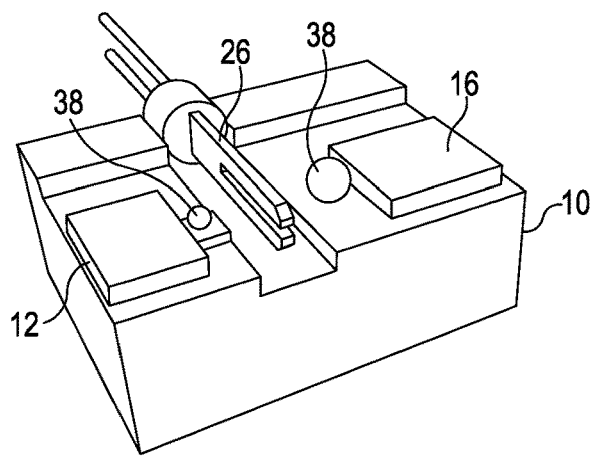

The example of FIG. 7B is similar to the example of FIG. 7A, however in the example of FIG. 7B the photoacoustic apparatus 10 does not comprise acoustic resonator tubes 44.

Figure 7C:
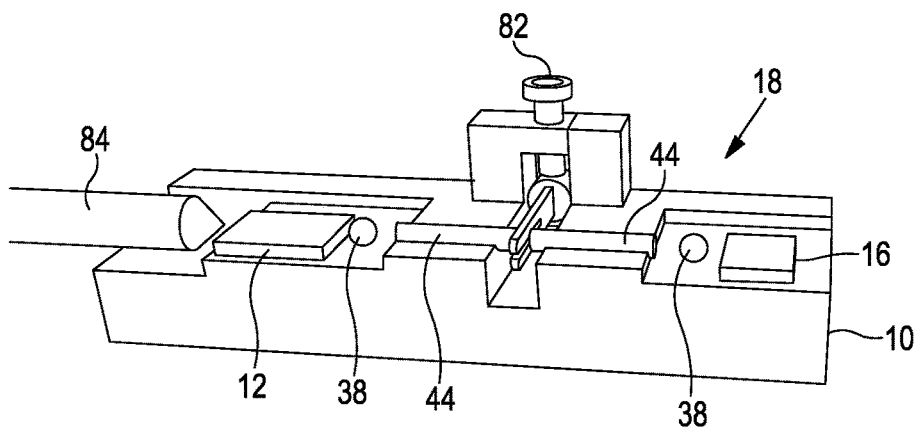

The example of FIG. 7C is similar to the example of FIG. 7A, however in the example of FIG. 7C the photoacoustic apparatus 10 comprises a fibre 84 and the optical amplifier 12 is configured to allow a portion of the light to be tapped away by the fibre 84 to probe the laser light 25 to allow monitoring of the wavelength of the laser light 25 to be performed.

In the example of FIG. 7C the photoacoustic apparatus 10 also comprises adjustment means 82. The adjustment means 82 is configured to allow accurate positioning of the quartz fork 26.

In the illustrated example the adjustment means 82 comprises positioning screws above and below the base of the quartz fork 26.

In examples, the adjustment means 82 can be considered an adjustor, an adjustment arrangement, an adjustment mechanism and/or an adjustment controller and so on.

Figure 8:
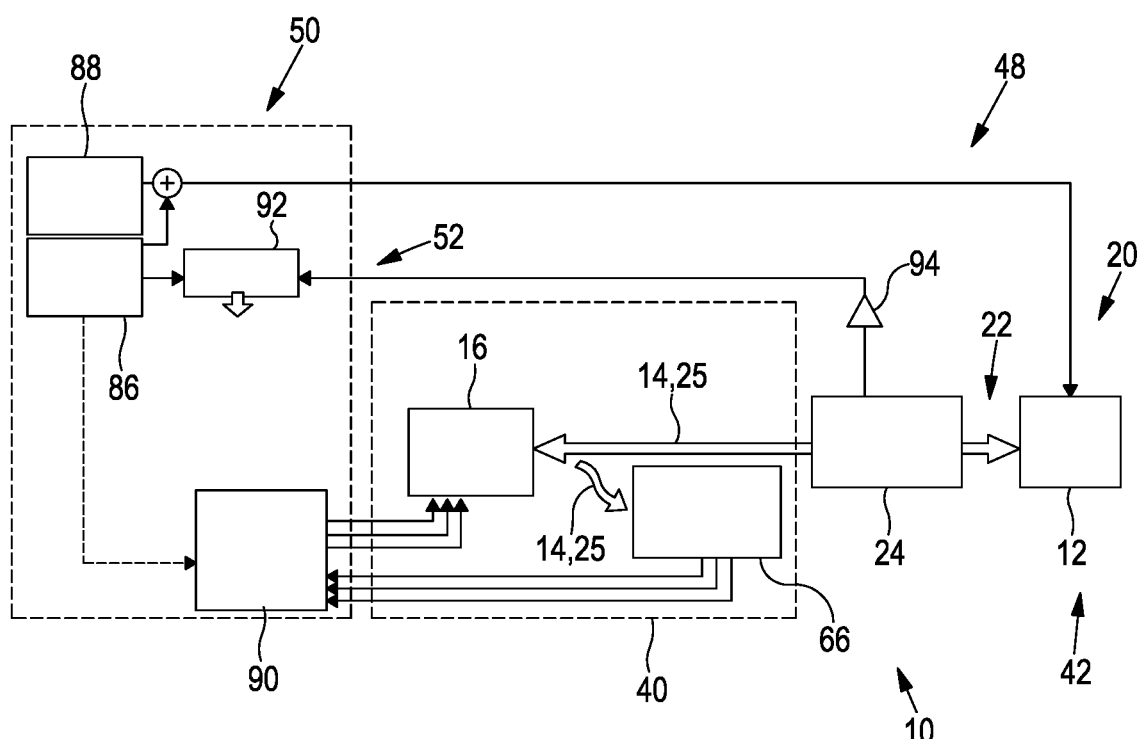
FIG. 8 shows an example of the subject-matter described herein.

FIG. 8 illustrates an example of a system 48.

In the example of FIG. 8 the system 48 is a system configured to perform photoacoustic spectroscopy. The system 48 of FIG. 8 can therefore be considered to be a photoacoustic spectroscopy system.

In the example of FIG. 8, the system 48 comprises a photoacoustic apparatus 10 as described herein. For example, the photoacoustic apparatus 10 can be as described in relation to one or more of FIGS. 1 to 7.

In the example of FIG. 8, the photoacoustic apparatus 10 comprises an optical amplifier 12, a photonic integrated circuit 16 and an acoustic sensor 24 located in between the optical amplifier 12 and photonic integrated circuit 16.

The light path between the optical amplifier 12 and photonic integrated circuit 16 is illustrated by the bold arrow.

In the example of FIG. 8, part of the light 14, 25 is tapped and directed towards a wavemeter 66 to monitor the wavelength of the laser.

In the example of FIG. 8 the system comprises means for controlling wavelength and/or amplitude modulation 50 of the laser light 25 and means for measuring signal output 52 from the at least one acoustic sensor 24.

In examples, the means comprises one or more electronic controls.

In the example of FIG. 8, the system 48 comprises a DC current source 88 configured to drive the optical amplifier 12. The system also comprises a waveform generator 86 and wavelength selector 90.

In examples, the average power of the laser is determined by the DC current source 88 and the central wavelength is set by applying the appropriate voltage or current to the photonic integrated circuit 16.

In examples, the wavelength modulation, for photoacoustic spectroscopy, around the central wavelength can be obtained by modulating the current in the optical amplifier 12. This modulates the effective index of the optical amplifier 12 and thus the optical length of the cavity 20.

This, in turn, modulates the wavelength of the selected longitudinal mode of the cavity 20.

If the pass band of the photonic integrated circuit 16 is broad enough to tolerate this modulation, its inputs can remain constant. However, in examples where the pass band is narrower than the modulation, the parameters of the photonic integrated circuit/filter 16 will also be modulated to compensate.

The acoustic sensor 24 is placed along the optical path 22 of the cavity 20. In examples, if the acoustic sensor 24, such as a quartz tuning fork, has an acoustic resonance, the modulation for each frequency can be chosen to be half the resonance of the acoustic sensor 24.

This is because the photoacoustic sound produced by wavelength modulation at an absorption peak has double the frequency or the modulation.

The system comprises a preamplifier 94 and lock in amplifier 92.

The output of the acoustic sensor 24 is pre-amplified in the preamplifier 94 and directed toward the lock in amplifier 92 which is synchronized with the modulation source 86.

In examples, the lock in amplifier 92 is set to measure the signal at the first harmonic of the modulation.

In examples, one or more elements of the system 48 can be altered and/or omitted and/or combined.

For example, in some examples the wavemeter 66 can be omitted.

FIG. 8 therefore illustrates a system 48 comprising at least one photoacoustic apparatus 10 as described herein; means for controlling wavelength and/or amplitude modulation of the laser light 25; and means for measuring signal output from the at least one acoustic sensor 24.

According to some, but not necessarily all, examples of the disclosure there is provided a method of providing a photoacoustic apparatus 10 as described herein. For example, a photoacoustic apparatus 10 as described in relation to one or more of FIGS. 1 to 8.

In examples, the method comprises providing at least one optical amplifier 10, configured to produce light 14;
providing at least one photonic integrated circuit 16, configured as a tunable light filter;
providing light guiding means 18, wherein the at least one optical amplifier 12, at least one photonic integrated circuit 16 and light guiding means 18 are configured as an optical cavity 20 to produce laser light 25 having an optical path 22 within the optical cavity 20; and
providing at least one acoustic sensor 24 configured to detect sound produced by the analyte 30.

In examples the method comprises providing means for introducing analyte 30 into the optical path 22 of the laser light 25.

Any suitable method for providing the components of the photoacoustic apparatus 10 can be used.

For example, the method can comprise any suitable method for manufacturing and/or fabricating and/or locating one or more elements of the photoacoustic apparatus 10.

In examples Micro-Electrical-Mechanical-System (MEMS) technology can be used in providing one or more components of the photoacoustic apparatus 10.

There is no required or preferred order for the actions of the method and the order and arrangement of the actions may be varied. Furthermore, it may be possible for some actions to be omitted According to some, but not necessarily all, examples there is provided a method comprising using at least one photoacoustic apparatus 10 to perform photoacoustic spectroscopy.

In examples, the at least one photoacoustic apparatus 10 can be as described herein. For example, the at least one photoacoustic apparatus 10 can be as described in relation to at least one of FIGS. 1 to 7.

In examples, the method can comprise controlling modulation of wavelength and/or amplitude of laser light produced by the photoacoustic apparatus 10.

In examples, the method can comprise detecting one or more signals produced by analyte 30 in the optical path 22 of the photoacoustic apparatus 10 in response to the modulation of wavelength and/or amplitude of laser light 25.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

I claim:

1. A photoacoustic apparatus, comprising:
    at least one optical amplifier, configured to produce light;
    at least one photonic integrated circuit, configured as a tunable light filter;
    a light guide, wherein the at least one optical amplifier, at least one photonic integrated circuit and light guide are configured as an optical cavity to produce laser light having an optical path within the optical cavity; and
    at least one acoustic sensor configured to detect sound produced by analyte introduced into the optical path of the laser light;
    wherein the at least one optical amplifier is configured to receive an application of a direct current for modulation of an optical length of the optical cavity.

2. A photoacoustic apparatus as claimed in claim 1, wherein the at least one optical amplifier comprises at least one semiconductor optical amplifier.

3. A photoacoustic apparatus as claimed in claim 1, wherein the at least one acoustic sensor comprises at least one quartz fork.

4. A photoacoustic apparatus as claimed in claim 3, wherein light guide comprises a lens configured to focus the laser light to pass between prongs of the at least one quartz fork.

5. A photoacoustic apparatus as claimed in claim 4, wherein the lens comprises a ball lens.

6. A photoacoustic apparatus as claimed in claim 1, comprising inlet configured to introduce analyte into the optical path of the laser light.

7. A photoacoustic apparatus as claimed in claim 1, wherein the light guide comprises a light coupler configured to couple light between the at least one optical amplifier and the at least one photonic integrated circuit.

8. A photoacoustic apparatus as claimed in claim 1, wherein the at least one acoustic sensor is located between the at least one optical amplifier and the at least one photonic integrated circuit.

9. A photoacoustic apparatus as claimed in claim 1, wherein the at least one optical amplifier is formed as a first chip and the at least one photonic integrated circuit is formed as a second, separate chip.

10. A photoacoustic apparatus as claimed in claim 1, wherein the at least one optical amplifier and the at least one photonic integrated circuit are combined on a chip.

11. A photoacoustic apparatus as claimed in claim 1, comprising at least one acoustic resonator tube configured to amplify sound produced by the analyte.

12. A method comprising:
providing at least one optical amplifier configured to produce light;
providing at least one photonic integrated circuit, configured as a tunable light filter;
providing a light guide, wherein the at least one optical amplifier, at least one photonic integrated circuit and light guide are configured as an optical cavity to produce laser light having an optical path within the optical cavity;
providing at least one acoustic sensor configured to detect sound produced by the analyte; and
receiving, at the at least one optical amplifier, an application of a direct current for modulation of an optical length of the optical cavity.

13. A method as claimed in claim 12, wherein the providing at least one optical amplifier comprises providing at least one semiconductor optical amplifier.

14. A method as claimed in claim 12, wherein the providing at least one acoustic sensor comprises providing at least one quartz fork.

15. A method as claimed in claim 14, wherein the providing a light guide comprises a providing a lens configured to focus the laser light to pass between prongs of the at least one quartz fork.

16. A method as claimed in claim 15, wherein the providing a lens comprises providing a ball lens.

17. A method as claimed in claim 12, further comprising providing inlet and configuring the inlet to introduce analyte into the optical path of the laser light.

18. A method as claimed in claim 12, wherein the providing a light guide comprises providing a light coupler and coupling light between the at least one optical amplifier and the at least one photonic integrated circuit.

19. A method as claimed in claim 12, wherein the providing at least one acoustic sensor comprises locating the at least one acoustic sensor between the at least one optical amplifier and the at least one photonic integrated circuit.

20. A method as claimed in claim 12, wherein the providing at least one optical amplifier and the providing at least one photonic integrated circuit comprise combining the at least one optical amplifier and the at least one photonic integrated circuit on a chip.

* * * * *